(12) United States Patent
Yamamoto

(10) Patent No.: US 12,508,869 B2
(45) Date of Patent: Dec. 30, 2025

(54) INFORMATION PROCESSING APPARATUS, INFORMATION PROCESSING METHOD, AND SYSTEM

(71) Applicant: TOYOTA JIDOSHA KABUSHIKI KAISHA, Toyota (JP)

(72) Inventor: Shinichi Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 18/500,406

(22) Filed: Nov. 2, 2023

(65) Prior Publication Data

US 2024/0149636 A1    May 9, 2024

(30) Foreign Application Priority Data

Nov. 7, 2022   (JP) .................................. 2022-178032

(51) Int. Cl.
*B60H 1/00* (2006.01)
*B60L 58/16* (2019.01)

(52) U.S. Cl.
CPC ..... *B60H 1/00735* (2013.01); *B60H 1/00385* (2013.01); *B60H 1/00657* (2013.01); *B60L 58/16* (2019.02); *B60L 2240/547* (2013.01)

(58) Field of Classification Search
CPC ............ B60H 1/00385; B60H 1/00657; B60H 1/00735; B60H 1/00771; B60L 1/003; B60L 2240/547; B60L 58/16
See application file for complete search history.

(56) References Cited

U.S. PATENT DOCUMENTS

| | | | | |
|---|---|---|---|---|
| 6,874,330 | B2* | 4/2005 | Iritani ................. | B60H 1/3208 62/236 |
| 7,350,365 | B2* | 4/2008 | Kim ....................... | F25B 27/02 62/323.3 |
| 8,096,482 | B2* | 1/2012 | Dage ................. | B60H 1/00849 236/51 |
| 8,909,390 | B2* | 12/2014 | Tonegawa ............... | B60L 1/003 62/157 |
| 9,340,090 | B2* | 5/2016 | Fukatsu ................. | B60L 53/62 |
| 9,589,455 | B2* | 3/2017 | Nakagawa .............. | B60L 53/51 |
| 10,919,363 | B2* | 2/2021 | Tamane ............. | B60H 1/00657 |
| 11,577,581 | B2* | 2/2023 | Kumar ................. | B60H 1/3208 |
| 12,208,787 | B2* | 1/2025 | Hou ...................... | B60W 10/06 |
| 2012/0104767 | A1* | 5/2012 | Gibson ................... | B60L 58/20 290/36 R |
| 2014/0330453 | A1* | 11/2014 | Nakagawa .............. | B60L 53/63 701/2 |
| 2016/0207541 | A1* | 7/2016 | Mansur ................. | B60W 20/16 |
| 2017/0368905 | A1* | 12/2017 | Li ........................ | B60W 10/30 |
| 2018/0222281 | A1 | 8/2018 | Tamane et al. | |
| 2018/0222282 | A1 | 8/2018 | Tamane | |
| 2018/0363572 | A1* | 12/2018 | Glugla ..................... | B60K 6/48 |
| 2021/0309077 | A1* | 10/2021 | Lee ......................... | G07C 5/08 |
| 2023/0065178 | A1* | 3/2023 | Hou ...................... | B60W 10/06 |

FOREIGN PATENT DOCUMENTS

| | | |
|---|---|---|
| JP | 2002-286818 A | 10/2002 |
| JP | 2005-145147 A | 6/2005 |
| JP | 2018-122837 A | 8/2018 |
| JP | 2018122836 A | 8/2018 |

* cited by examiner

*Primary Examiner* — Tyler J Lee
(74) *Attorney, Agent, or Firm* — Dinsmore & Shohl LLP

(57) ABSTRACT

Provided is a controller configured to provide a restriction on the start or stop of remote air conditioning in response to the fact that a battery of a vehicle is in a predetermined state of deterioration.

14 Claims, 22 Drawing Sheets

VEHICLE INFORMATION DB

| VEHICLE ID | USER ID | SOC | VOLTAGE | STATE OF DETERIORATION |
|---|---|---|---|---|
| V001 | xxx | xxx | xxx | xxx |
| ... | ... | ... | ... | ... |

FIG. 4

INFORMATION PROCESSING APPARATUS, INFORMATION PROCESSING METHOD, AND SYSTEM

CROSS REFERENCE TO THE RELATED APPLICATION

This application claims the benefit of Japanese Patent Application No. 2022-178032, filed on Nov. 7, 2022, which is hereby incorporated by reference herein in its entirety.

BACKGROUND

Technical Field

The present disclosure relates to an information processing apparatus, an information processing method, and a system.

Description of the Related Art

There has been known a remote air conditioning system in which the air conditioning of a vehicle is started based on a start request transmitted from a terminal, and the air conditioning is stopped when a predetermined temperature is reached (for example, Patent Literature 1).

CITATION LIST

Patent Literature

Patent Literature 1: Japanese Patent Application Laid-Open Publication No. 2018-122836

SUMMARY

The object of the present disclosure is to prevent a vehicle from becoming difficult to travel due to deterioration of a battery.

One aspect of the present disclosure is directed to an information processing apparatus comprising a controller configured to provide a restriction on the start or stop of remote air conditioning in response to the fact that a battery of a vehicle is in a predetermined state of deterioration.

Another aspect of the present disclosure is directed to an information processing method comprising causing a computer to provide a restriction on the start or stop of remote air conditioning in response to the fact that a battery of a vehicle is in a predetermined state of deterioration.

A further aspect of the present disclosure is directed to a system comprising:
  a vehicle configured to execute remote air conditioning by operating an engine; and
  a server configured to transmit a command for execution of the remote air conditioning to the vehicle;
  wherein the server includes a controller configured to perform:
  obtaining information about a state of deterioration of a battery of the vehicle; and
  providing a restriction on the start or stop of the remote air conditioning in response to the fact that the battery is in a predetermined state of deterioration.

In addition, a still further aspect of the present disclosure is directed to a program for causing a computer to perform the above-described method, or a storage medium storing the program in a non-transitory manner.

According to the present disclosure, it is possible to prevent a vehicle from becoming difficult to travel due to deterioration of a battery.

BRIEF DESCRIPTION OF THE DRAWINGS

FIG. 4 is a view illustrating an example of a table configuration of a vehicle information database (DB) according to the embodiment;

DESCRIPTION OF THE EMBODIMENTS

Figure 1:
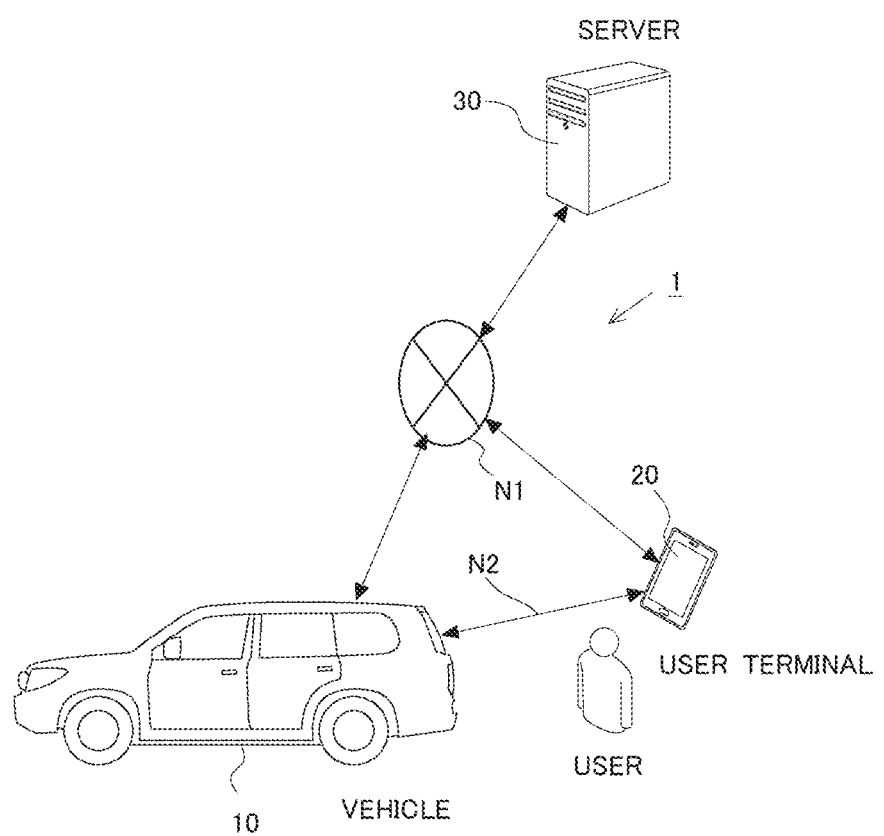
FIG. 1 is a view illustrating a schematic configuration of a system according to an embodiment.

An information processing apparatus, which is one aspect of the present disclosure, includes a controller configured to restrict the start or stop of remote air conditioning in response to the fact that a battery of a vehicle is in a predetermined state of deterioration. The remote air conditioning is air conditioning performed by a user from outside the vehicle via remote operation, and is performed, for example, by the user transmitting a request to perform air conditioning from outside the vehicle using a user terminal. The destination of transmission of the request may be the information processing apparatus for the vehicle or may be an external information processing apparatus that provides commands or instructions to the vehicle.

The battery of the vehicle supplies electric power to, for example, a starter motor that starts an engine. The execution of the remote air conditioning involves the operation of the engine. For example, air conditioning may be performed by making use of cooling water whose temperature rises due to heat generated from the engine, or air conditioning may be performed by operating a compressor using a rotational force of an output shaft of the engine, or air conditioning may be performed while the engine generates electric power that is consumed when air conditioning is performed. Here, when electric power is supplied from the battery at the time of starting the engine, the remaining amount of charge in the battery decreases. Even when the remaining amount of charge in the battery decreases, if the engine is kept in operation, the remaining amount of charge in the battery will recover because electric power is generated by the operation of a generator.

However, the battery capacity of the battery decreases as the deterioration thereof proceeds. That is, even in a fully charged state, the energy that can be supplied from the battery is reduced. Then, when the deterioration of the battery progresses to some extent, there may not be enough energy left in the battery to restart the engine if the engine is stopped immediately after starting thereof. In this case, it becomes difficult to restart the engine, which could make it difficult for the vehicle to travel.

Therefore, the controller provides a restriction on the start or stop of the remote air conditioning in response to the fact that the battery is in a predetermined state of deterioration, thereby suppressing a decrease in the remaining amount of charge in the battery. Providing the restriction on the start of the remote air conditioning includes, for example, that the remote air conditioning is not started, or that the remote air conditioning is started only when a predetermined condition is satisfied. By providing the restriction on the start of the remote air conditioning, for example, it is possible to eliminate electric power consumed for air conditioning and electric power consumed for starting the engine, so that a decrease in the remaining amount of charge in the battery can be suppressed.

In addition, providing the restriction on the stop of the remote air conditioning includes, for example, not stopping the remote air conditioning, or stopping the remote air conditioning only when a predetermined condition is satisfied. By providing the restriction on the stop of the remote air conditioning, for example, power generation by the engine can be continued, so that the remaining amount of charge in the battery can be recovered. In this way, it is possible to secure the energy required for starting of the engine.

Hereinafter, embodiments of the present disclosure will be described based on the accompanying drawings. The configurations of the following embodiments are examples, and the present disclosure is not restricted to the configurations of the embodiments. In addition, the following embodiments can be combined with one another as long as such combinations are possible and appropriate.

First Embodiment

FIG. 1 is a view illustrating a schematic configuration of a system 1 according to an embodiment. The system 1 is a system that can remotely operate an air conditioner of a vehicle 10 according to a request transmitted from a user terminal 20 to a server 30. In this system 1, the vehicle 10 or the server 30 provides a restriction on the start or stop of remote air conditioning according to the state of deterioration of the battery of the vehicle 10.

In the example of FIG. 1, the system 1 includes the vehicle 10, the user terminal 20 and the server 30. The user terminal 20 is a mobile terminal that is owned or carried by a user. The user terminal 20 can transmit a request for the start and stop of remote air conditioning. In addition, the vehicle 10 is a vehicle associated with the user terminal 20. The vehicle 10, the user terminal 20 and the server 30 are mutually connected to one another by means of a network N1. Here, note that the network N1 is, for example, a worldwide public communication network such as the Internet or the like, and a WAN (Wide Area Network) or other communication networks may be adopted. Also, the network N1 may include a telephone communication network such as a mobile phone network or the like, and/or a wireless communication network such as Wi-Fi (registered trademark) or the like. Further, the vehicle 10 may be connected to the user terminal 20 via a network N2 including short-range wireless communication or the like. FIG. 1 illustrates one vehicle 10 by way of example, but there can be a plurality of vehicles 10. In addition, there can also be a plurality of users and user terminals 20, depending on the number of vehicles 10.

Figure 2:
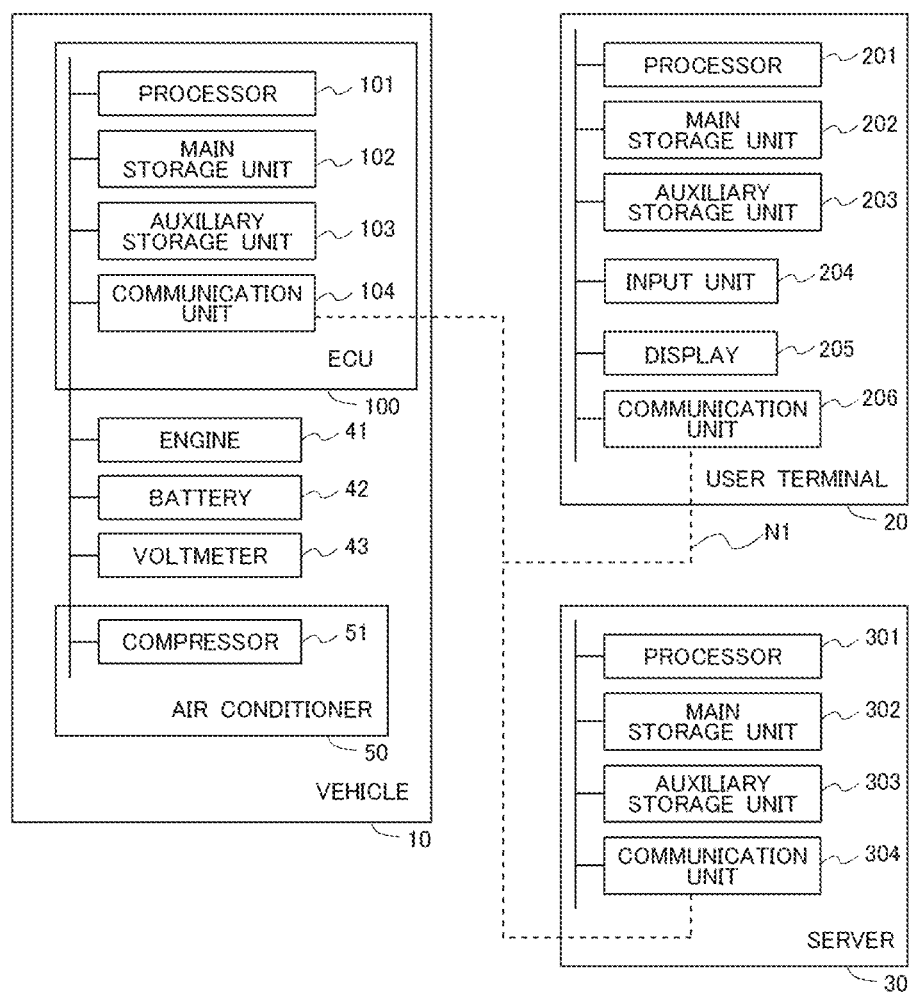
FIG. 2 is a block diagram schematically illustrating an example of a configuration of each of a vehicle, a user terminal and a server, which together constitute the system according to the embodiment.

Hardware configurations of the vehicle 10, the user terminal 20, and the server 30 will be described based on FIG. 2. FIG. 2 is a block diagram schematically illustrating an example of a configuration of each of the vehicle 10, the user terminal 20 and the server 30, which together constitute the system 1 according to the embodiment.

The server 30 has a configuration of a computer. The server 30 includes a processor 301, a main storage unit 302, an auxiliary storage unit 303, and a communication unit 304. These components are mutually connected to one another by means of a bus. Note that the processor 301 is an example of a controller.

The processor 301 is a CPU (Central Processing Unit), a DSP (Digital Signal Processor), or the like. The processor 301 controls the server 30 thereby to perform various information processing operations. The main storage unit 302 is a RAM (Random Access Memory), a ROM (Read Only Memory), or the like. The auxiliary storage unit 303 is an EPROM (Erasable Programmable ROM), a hard disk drive (HDD), a removable medium, or the like. The auxiliary storage unit 303 stores an operating system (OS), various programs, various tables, and the like. The processor 301 loads a program stored in the auxiliary storage unit 303 into a work area of the main storage unit 302 and executes the program, so that each component or the like is controlled through the execution of the program. As a result, the server 30 realizes functions that match predetermined purposes. The main storage unit 302 and the auxiliary storage unit 303 are computer readable recording media. Here, note that the server 30 may be a single computer or a plurality of computers that cooperate with one another. In addition, the information stored in the auxiliary storage unit 303 may be stored in the main storage unit 302. Also, the information stored in the main storage unit 302 may be stored in the auxiliary storage unit 303.

The communication unit 304 is a means or unit that communicates with the vehicle 10 and the user terminal 20 via the network N1. The communication unit 304 is, for example, a LAN (Local Area Network) interface board, a wireless communication circuit for wireless communication, or the like. The LAN interface board or the wireless communication circuit is connected to the network N1.

Here, note that a series of processing executed by the server 30 can be executed by hardware, but can also be executed by software.

Now, the user terminal 20 will be described. The user terminal 20 is, for example, a smart phone, a mobile phone, a tablet terminal, a personal information terminal, a wearable computer (such as a smart watch or the like), or a small computer such as a personal computer (PC). The user terminal 20 includes a processor 201, a main storage unit 202, an auxiliary storage unit 203, an input unit 204, a display 205, and a communication unit 206. These components are mutually connected to one another by means of a bus. The processor 201, the main storage unit 202 and the auxiliary storage unit 203 are the same as the processor 301, the main storage unit 302 and the auxiliary storage unit 303 of the server 30, respectively, and hence, the description thereof will be omitted.

The input unit 204 is a means or unit for receiving an input operation performed by a user, and is, for example, a touch panel, a mouse, a keyboard, a microphone, a push button, or the like. The display 205 is a means or unit that presents information to the user, and is, for example, an LCD (Liquid Crystal Display), an EL (Electroluminescence) panel, or the like. The input unit 204 and the display 205 may be configured as a single touch panel display.

The communication unit 206 is a communication means or unit for connecting the user terminal 20 to the network N1 or the network N2. The communication unit 206 is, for example, a circuit for communicating with other devices (e.g., the vehicle 10, the server 30 or the like) via the network N1 or the network N2 by making use of a mobile communication service (e.g., a telephone communication network such as 6G (6th Generation), 5G (5th Generation), 4G (4th Generation), 3G (3rd Generation), or LTE (Long Term Evolution)) or a wireless communication network such as Wi-Fi (registered trademark), Bluetooth (registered trademark) or the like.

Next, the vehicle 10 will be described. The vehicle 10 is equipped with an engine 41. The vehicle 10 includes an ECU 100, which is an electronic control unit, the engine 41, a battery 42, a voltmeter 43, and an air conditioner 50. These components are mutually connected to one another by means of a CAN bus, which is a bus of an in-vehicle network. Here, note that the present embodiment includes one ECU 100, but instead may include controllers corresponding to communication with the outside, control of the engine 41, and control of the air conditioner 50, respectively. In addition, each of these components may not be a single module, but they may be realized by a combination of an in-vehicle device such as a car navigation system or the like, an in-vehicle communication device, an ECU (Electronic Control Unit), and the like.

The ECU 100 has a configuration of a computer. The ECU 100 includes a processor 101, a main storage unit 102, an auxiliary storage unit 103, and a communication unit 104. These components are mutually connected to one another by means of a bus. The processor 101, the main storage unit 102, the auxiliary storage unit 103, and the communication unit 104 are the same as the processor 201, the main storage unit 202, the auxiliary storage unit 203, and the communication unit 206 of the user terminal 20, respectively, and hence, the description thereof will be omitted. Note that the processor 101 is an example of a controller.

The engine 41 is, for example, a gasoline engine or a diesel engine, and its output can be used to charge the battery 42 or to drive the vehicle 10. In addition, cooling water for the engine 41 can also be used as a heat source for heating. Also, a compressor 51 of the air conditioner 50 can be operated by operating the engine 41. The battery 42 is a secondary battery that can be repeatedly charged and discharged. The voltmeter 43 is a device that measures the voltage of the battery 42.

The air conditioner 50 is a device that adjusts the temperature inside the vehicle 10. The air conditioner 50 includes the compressor 51. The compressor 51 is a device that is operated by power from the engine 41 to compress and liquefy vaporized refrigerant. The compressor 51 includes, for example, a pulley connected to a crankshaft of the engine 41 through a belt. A magnet clutch, which is connected or engaged by passing electricity therethrough, is connected to the pulley, and the compressor 51 is operated by passing electricity to the magnet clutch when the engine 41 is operating. Here, note that the compressor 51 may be an electric compressor that is operated by the supply of electric power from the battery 42.

Figure 3:
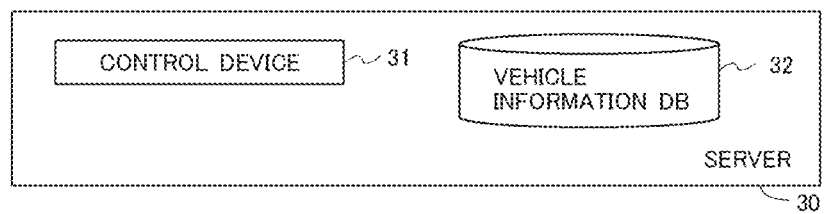
FIG. 3 is a diagram illustrating an example of a functional configuration of the server according to the embodiment.

Then, the functions of the server 30 will be described. FIG. 3 is a diagram illustrating an example of a functional configuration of the server 30 according to the embodiment. The server 30 includes, as its functional components, a control device 31 and a vehicle information DB 32. The processor 301 of the server 30 executes the processing of the control device 31 by means of a computer program on the main storage unit 302.

The vehicle information DB 32 is, for example, a relational database that is built by a program of a database management system (DBMS) executed by the processor 301 to manage data stored in the auxiliary storage unit 303.

Upon receiving an air-conditioning request from the user terminal 20, the control device 31 transmits an air conditioning command to the vehicle 10. The air conditioning request is a request to remotely operate the air conditioner 50. The air conditioning request includes information that can identify the user (user ID), information about a set temperature, and the like. The air conditioning command is a command to remotely operate the air conditioner 50 of the vehicle 10. The air conditioning command includes a command to start the engine 41 and to operate the air conditioner 50, as well as information about the set temperature. The control device 31 derives the vehicle 10 associated with the user ID included in the air conditioning request from the information in the vehicle information DB 32 in FIG. 4, which will be described later, and identifies a vehicle 10 to which various commands will be transmitted.

In addition, the control device 31 obtains from the vehicle 10 information about the remaining amount of charge (hereinafter, also referred to as State Of Charge (SOC)) and the voltage of the battery 42, and stores the information thus obtained in the vehicle information DB 32. In the following, these pieces of information are also referred to as battery information. Here, FIG. 4 is a view illustrating an example of a table configuration of the vehicle information DB 32 according to the embodiment. The vehicle information DB 32 has fields for vehicle ID, user ID, SOC, voltage, and state of deterioration. In the vehicle ID field, information (vehicle ID) that can identify each vehicle 10 is stored. In the user ID field, information (user ID) that can identify the user associated with each vehicle 10 is stored. In the SOC field, information about the remaining amount of charge in each battery 42 is stored. In the voltage field, information about the voltage of each battery 42 is stored. The information about the remaining amount of charge and the information about the voltage may be transmitted from the vehicle 10 immediately before the vehicle 10 is parked to stop its functions, or may be transmitted from the vehicle 10 at predetermined time intervals. Here, note that the vehicle information DB 32 illustrated in FIG. 4 stores information about each of the remaining amount of charge and the voltage, but both pieces of information are not necessarily required, and either one of them may be stored. The information to be stored in the vehicle information DB 32 may be the information that is necessary for determining the deterioration of each battery 42 and for determining whether or not a condition for stopping the remote air conditioning, which will be described later, is satisfied.

The state of deterioration field stores information about the state of deterioration of the battery 42 of each vehicle 10. For example, the state of deterioration field may store information indicating whether or not the battery 42 is in a predetermined state of deterioration, or may store a degree of deterioration of the battery 42. For example, the control device 31 determines whether or not the battery 42 is in a predetermined state of deterioration, and stores the result of the determination in the vehicle information DB 32. Then, the control device 31 provides a restriction on the start or stop of remote air conditioning in response to the fact that the battery 42 is in the predetermined state of deterioration. The predetermined state of deterioration is, for example, a state of deterioration in which starting and stopping remote air conditioning once or a predetermined number of times can cause the remaining amount of charge in the battery 42 to decrease, thus resulting in that the movement of the vehicle 10 becomes difficult. The fact that the movement of the vehicle 10 becomes difficult means, for example, that it becomes difficult to restart the engine 41. Here, note that a known technique can be used to determine the state of deterioration of the battery 42. For example, in cases where the battery capacity when fully charged becomes a predetermined ratio as compared with the battery capacity when new, the battery 42 may be determined to be the predetermined state of deterioration.

In the case of providing a restriction on the start of remote air conditioning, for example, a command may be transmitted so that an air conditioning request cannot be generated at the user terminal 20, or a command may be transmitted so that an air conditioning request is not accepted at the vehicle 10, or the control device 31 may not accept an air conditioning request at the server 30. If the remote air conditioning is not started, it is possible to suppress a subsequent decrease in the remaining amount of charge in the battery 42, and hence, for example, it is possible to secure a remaining amount of charge in which the engine 41 can be started.

Further, in the case of providing a restriction on the stop of the remote air conditioning, for example, a command may be transmitted so that an air conditioning stop request cannot be generated at the user terminal 20 until the remaining amount of charge in the battery 42 becomes equal to or greater than a predetermined amount or until the voltage of the battery 42 becomes higher than a predetermined voltage, or a command may be transmitted so that an air conditioning stop request is not accepted at the vehicle 10, or the control device 31 may not accept an air conditioning stop request at the server 30. Note that the air conditioning stop request is a request to remotely stop the air conditioner 50. The air conditioning stop request includes information (user ID) that can identify the user and the like. The predetermined amount for the remaining amount of charge in the battery 42 is, for example, a remaining amount of charge required to start the engine 41. That is, the remaining amount of charge in the battery 42 decreases in order to start the engine 41 when remote air conditioning is started, and hence, if the engine 41 is stopped immediately, the engine 41 will stop before the remaining amount of charge in the battery 42 recovers. In this case, it may be difficult to restart the engine 41. On the other hand, if the engine 41 is operated until the remaining amount of charge in the battery 42 becomes the predetermined amount, the engine 41, even if stopped thereafter, can be restarted. In addition, the predetermined voltage of the battery 42 is a voltage at which it becomes difficult to start the engine 41 when remote air conditioning is executed in the case where the battery 42 is in the predetermined state of deterioration. That is, if the engine 41 is kept in operation until the voltage of the battery 42 becomes higher than the predetermined voltage, the engine 41, even if stopped thereafter, can be restarted.

Figure 5:
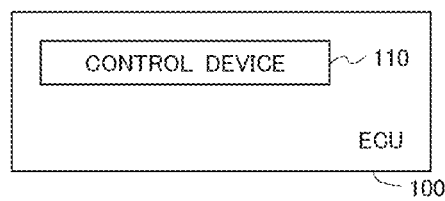
FIG. 5 is a diagram illustrating an example of a functional component of an ECU according to the embodiment.

Next, a functional component of the ECU 100 of the vehicle 10 will be described. FIG. 5 is a diagram illustrating an example of the functional component of the ECU 100 according to the embodiment. The ECU 100 includes a control device 110 as its functional component. The processor 101 of the ECU 100 executes the processing of the control device 110 by means of a computer program on the main storage unit 102. However, any of the individual functional components or a part of the processing thereof may be implemented by a hardware circuit.

Upon receiving an air conditioning command from the server 30, the control device 110 operates the engine 41 and the air conditioner 50 based on this air conditioning command. Thus, the remote air conditioning of the vehicle 10 is started. When the remote air conditioning is performed, the engine 41 is operated to perform air conditioning. Here, note that a known technique can be used for the control of the air conditioner 50. In addition, the control device 110 transmits information about the remaining amount of charge in the battery 42 to the server 30 at predetermined time intervals.

Figure 6:
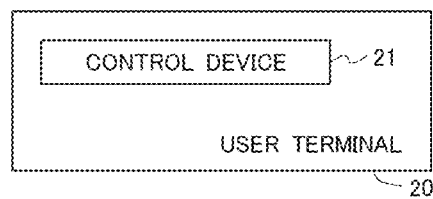
FIG. 6 is a diagram illustrating a functional configuration of the user terminal according to the embodiment.

Next, the function of the user terminal 20 will be described. FIG. 6 is a diagram illustrating a functional configuration of the user terminal 20 according to the embodiment. The user terminal 20 includes a control device 21 as its functional component. The processor 201 of the user terminal 20 executes the processing of the control device 21 by a computer program on the main storage unit 202. However, a part of the processing of the control device 21 may be executed by a hardware circuit.

The control device 21 generates an air conditioning request in accordance with an input of a user, and transmits it to the server 30. For example, when the user taps a predetermined icon displayed on the display 205, the control device 21 activates application software (hereinafter also referred to as an app) capable of executing remote air conditioning. Here, the app capable of executing remote air conditioning has been installed in the user terminal 20, and when the user activates the app, an image for executing remote air conditioning is displayed.

Figure 7:
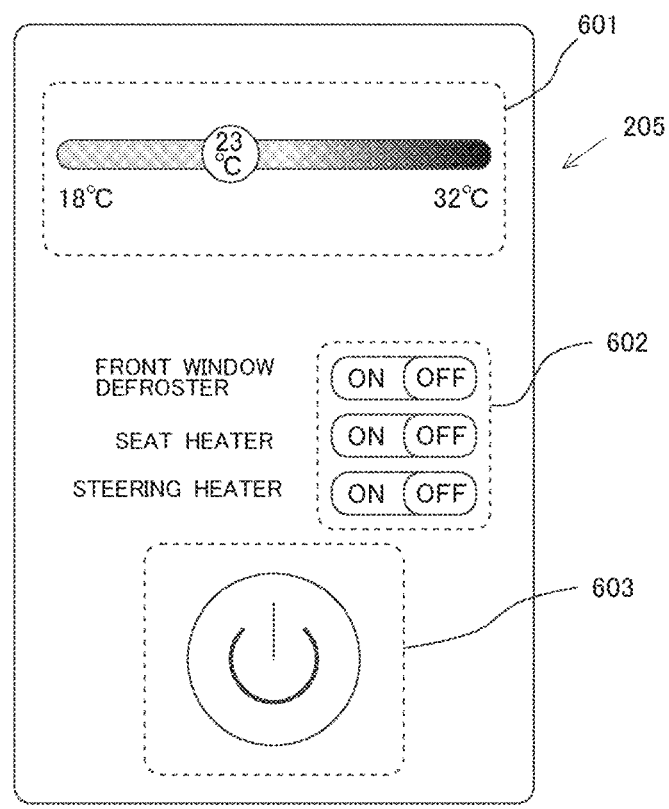
FIG. 7 is a view illustrating an example of an image displayed on a display when an application capable of executing remote air conditioning is activated according to the embodiment.

FIG. 7 is a view illustrating an example of an image displayed on the display 205 when the app capable of executing remote air conditioning is activated according to the embodiment. Note that FIG. 7 is an example of a user interface for specifying air conditioning parameters illustrated. The illustrated user interface is configured to include a slider (reference numeral 601) for setting a temperature, toggle buttons (reference numeral 602) for specifying devices to be operated, a button (reference numeral 603) for transmitting a request, and the like.

Figure 8:
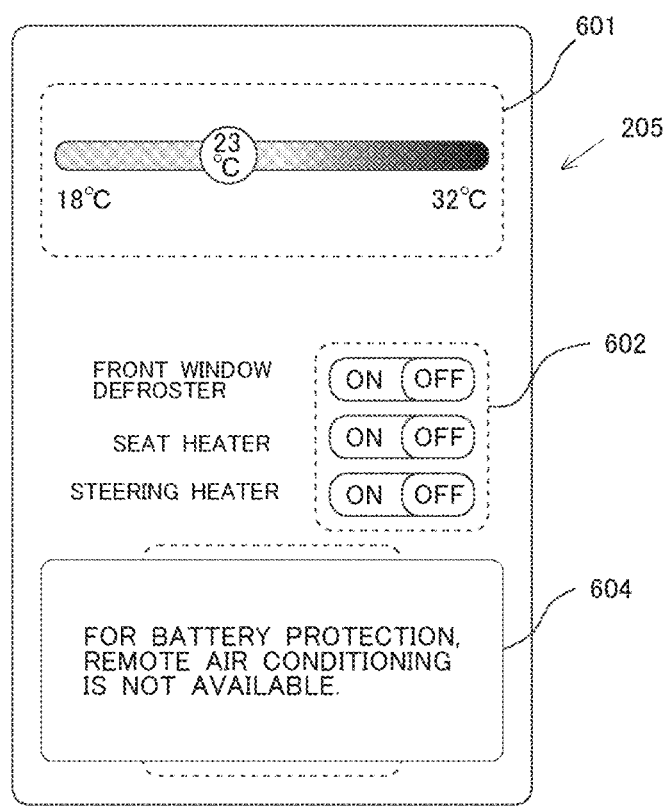
FIG. 8 is a view illustrating an example of an image displayed on the display in the case where the start of remote air conditioning is restricted according to the embodiment.

In addition, FIG. 8 is a view illustrating an example of an image displayed on the display 205 in the case where the start of remote air conditioning is restricted according to the embodiment. In the case where the start of remote air conditioning is restricted, a statement to the effect that remote air conditioning is not available is displayed, as indicated by reference numeral 604, so that an air conditioning request cannot be generated and transmitted. For example, when the user activates the app, the control device 21 displays the image illustrated in FIG. 8 on the display 205 upon receiving from the server 30 information about the fact that the start of remote air conditioning is restricted. Here, note that, as an alternative, after transmitting an air conditioning request to the server 30, the control device 21 may receive from the server 30 a command to display the image illustrated in FIG. 8 on the display 205. Then, in accordance with this command, the control device 21 may display the image illustrated in FIG. 8 on the display 205.

Figure 9:
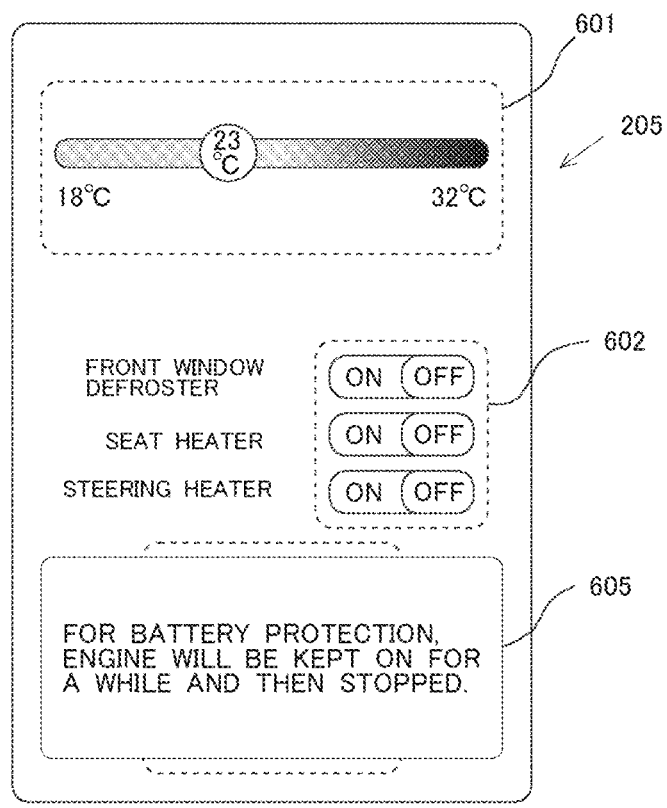
FIG. 9 is a view illustrating an example of an image displayed on the display in the case where the stop of remote air conditioning is restricted according to the embodiment.

Further, FIG. 9 is a view illustrating an example of an image displayed on the display in the case where the stop of remote air conditioning is restricted according to the embodiment. In the case where the stop of remote air conditioning is restricted, a statement to the effect that remote air conditioning cannot be stopped is displayed, as indicated by reference numeral 605, so that an air conditioning stop request cannot be generated and transmitted. For example, when the user activates the app, the control device 21 displays the image illustrated in FIG. 9 on the display 205 upon receiving from the server 30 information about the fact that the stop of remote air conditioning is restricted. Here, note that, as an alternative, after transmitting an air conditioning stop request to the server 30, the control device 21 may receive from the server 30 a command to display the image illustrated in FIG. 9 on the display 205. Then, in accordance with this command, the control device 21 may display the image illustrated in FIG. 9 on the display 205.

Figure 10:
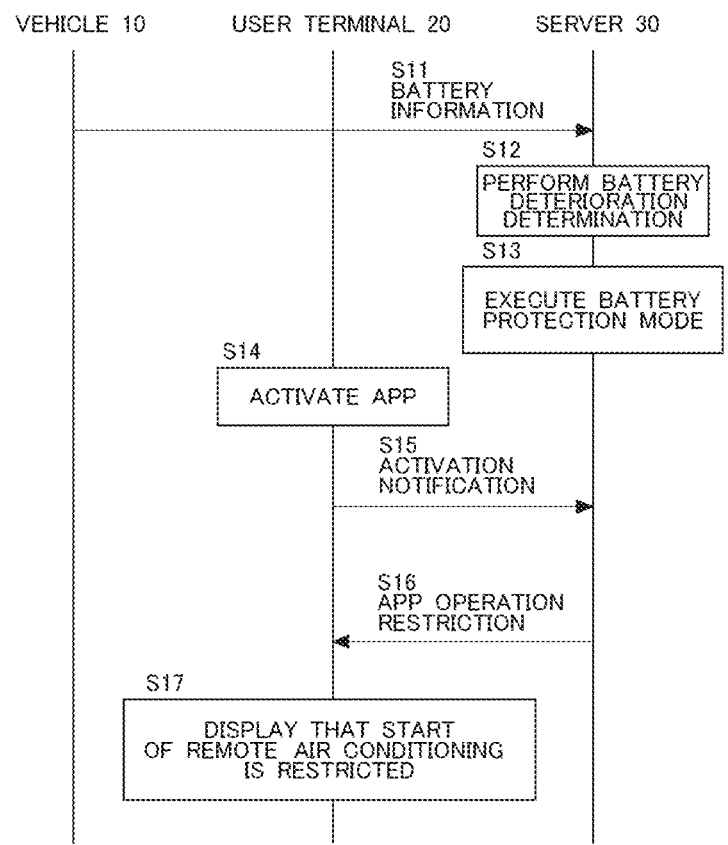
FIG. 10 is a sequence diagram of the processing of the system as a whole according to a first embodiment.

Then, the processing of the system 1 as a whole will be described. Note that in a first embodiment, an example will be described in which the server 30 restricts the start of remote air conditioning. FIG. 10 is a sequence diagram of the processing of the system 1 as a whole according to the first embodiment. The vehicle 10 and the user terminal 20 illustrated in FIG. 10 have been associated with each other in advance and registered in the server 30. FIG. 10 is a sequence diagram in the case where the start of remote air conditioning is restricted by the server 30.

Battery information is transmitted from the vehicle 10 to the server 30 at predetermined time intervals (S11). The battery information is information that correlates with the deterioration of the battery 42, and is, for example, information about SOC, the transition of the SOC, the voltage, or the transition of the voltage. Note that, as an alternative, the battery information may be information for notifying that the control device 110 of the vehicle 10 has determined that the battery 42 is in the predetermined state of deterioration. That is, the control device 110 of the vehicle 10 may determine the state of deterioration of the battery. The battery information received by the server 30 is stored in the vehicle information DB 32. In the server 30, deterioration determination of the battery 42 is performed based on the battery information (S12). Then, when it is determined at the server 30 that the battery 42 is in the predetermined state of deterioration, a battery protection mode is executed (S13). The battery protection mode referred to herein is a mode in which a decrease in the remaining amount of charge in the battery 42 is suppressed by restricting the start of remote air conditioning.

Thereafter, when an app for executing the remote air conditioning is activated at the user terminal 20 (S14), a notification that the app has been activated (hereinafter, also referred to as an activation notification) is transmitted from the user terminal 20 to the server 30 (S15). When the server 30 running in the battery protection mode receives the activation notification, the server 30 transmits a command to restrict the operation of the app (which may be the generation of an air conditioning request) to the user terminal 20 (S16). This command includes, for example, a command to display the image illustrated in FIG. 8 on the display 205. The user terminal 20, which has received this command, displays, for example, the image illustrated in FIG. 8 on the display 205. That is, it is displayed that the start of remote air conditioning is restricted (S17).

Figure 11:
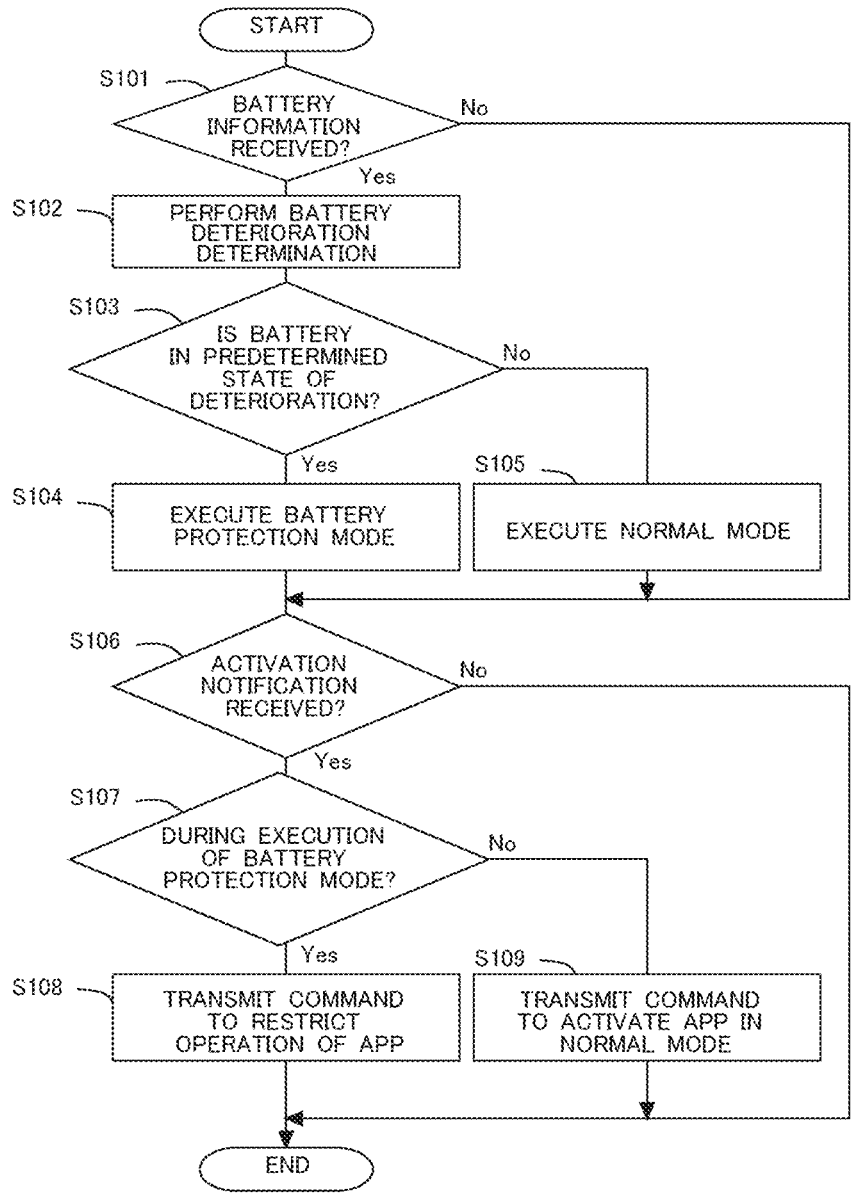
FIG. 11 is a flowchart of the processing of remote air conditioning in the server according to the first embodiment.

Next, the processing of the remote air conditioning in the server 30 will be described. FIG. 11 is a flowchart of the processing of the remote air conditioning in the server 30 according to the first embodiment. The processing illustrated in FIG. 11 is performed at predetermined time intervals at the server 30. In addition, the processing illustrated in FIG. 11 is performed for each vehicle 10.

In step S101, the control device 31 determines whether or not battery information has been received from the vehicle 10. Here, note that the battery information may be transmitted from the vehicle 10, for example, at the time of shutting down the vehicle 10 (or at the time of IG-OFF), or may be transmitted from the vehicle 10 at predetermined time intervals. When an affirmative determination is made in step S101, the processing proceeds to step S102, whereas when a negative determination is made, the processing proceeds to step S106.

In step S102, the control device 31 determines the state of deterioration of the battery 42. The state of deterioration of the battery 42 may be determined based on a known technique. The control device 31 updates the vehicle information DB 32 by storing the state of deterioration of the battery 42 in the vehicle information DB 32 illustrated in FIG. 4. In step S103, the control device 31 determines whether or not the battery 42 is in the predetermined state of deterioration. Here, it is determined whether or not the movement of the vehicle 10 may become difficult due to the execution of the remote air conditioning. When an affirmative determination is made in step S103, the processing proceeds to step S104, whereas when a negative determination is made, the processing proceeds to step S105. In step S104, the control device 31 executes the battery protection mode. On the other hand, in step S105, the control device 31 executes a normal mode. The normal mode is a mode in which an air conditioning command is generated and transmitted to the vehicle 10 when an air conditioning request is received from the user terminal 20.

In step S106, the control device 31 determines whether or not an activation notification for the app has been received from the user terminal 20. When an affirmative determination is made in step S106, the processing or routine proceeds to step S107, whereas when a negative determination is made, this routine is ended. In step S107, the control device 31 determines whether or not the battery protection mode is being performed. When an affirmative determination is made in step S107, the processing proceeds to step S108, whereas when a negative determination is made, the processing proceeds to step S109.

In step S108, the control device 31 transmits a command to restrict the operation of the app to the user terminal 20. This command includes a command to display on the display 205 that remote air conditioning is not available. At this time, for example, the image illustrated in FIG. 8 is displayed at the user terminal 20. On the other hand, in step S109, the control device 31 transmits, to the user terminal 20, a command to activate the app in the normal mode. The command to activate the app in the normal mode is a command to activate the app in a state in which the operation of the app is not restricted.

Here, note that in the routine illustrated in FIG. 11, the command to restrict the operation of the app is transmitted to the user terminal 20 after receiving the activation notification, but as an alternative, after the battery protection mode is executed in step S104, the processing of step S108 may be executed to restrict the operation of the app.

As described above, according to the present embodiment, in the case where the battery 42 of the vehicle 10 is in the predetermined state of deterioration, the start of the remote air conditioning is restricted, so that a decrease in the remaining amount of charge in the battery 42 can be suppressed. As a result, it is possible to suppress the vehicle 10 from becoming unable to move.

Second Embodiment

Figure 12:
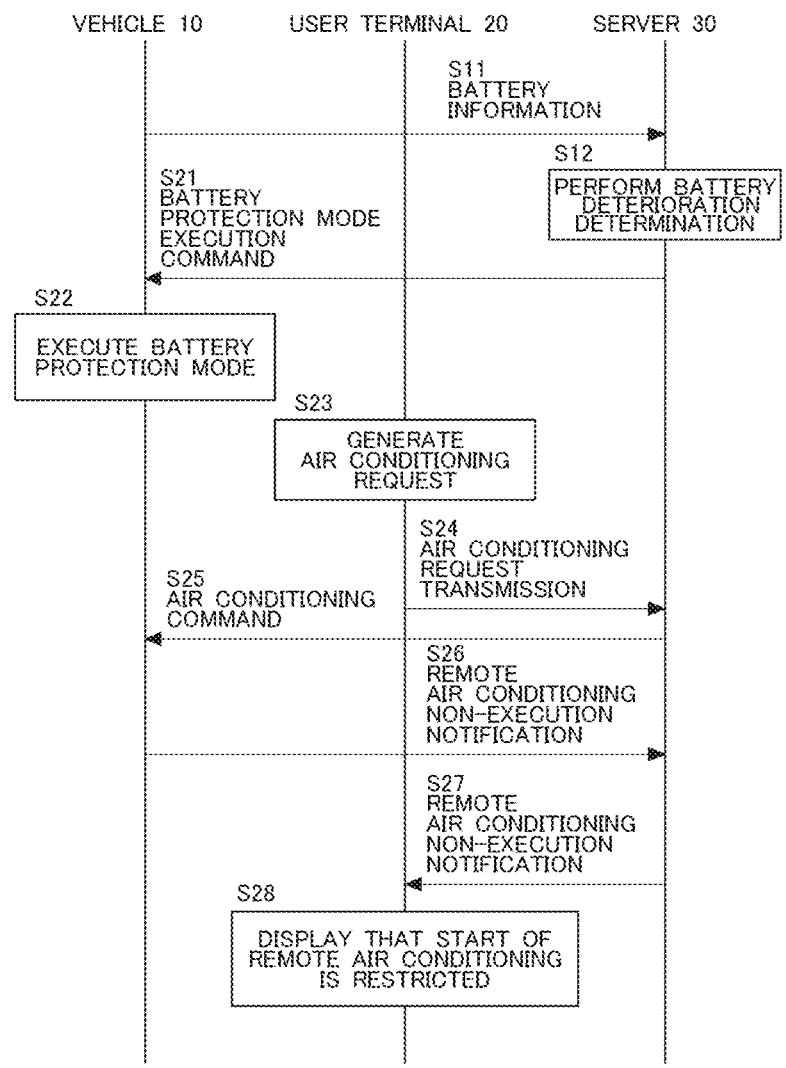
FIG. 12 is a sequence diagram of the processing of the system as a whole according to a second embodiment.

In a second embodiment, an example will be described in which the vehicle 10 restricts the start of remote air conditioning. FIG. 12 is a sequence diagram of the processing of the system 1 as a whole according to the second embodiment. The vehicle 10 and the user terminal 20 illustrated in FIG. 12 have been associated with each other in advance and registered in the server 30. FIG. 12 is a sequence diagram in the case where the stop of remote air conditioning is restricted by the vehicle 10. The same processing as in the sequence diagram illustrated in FIG. 10 will be denoted by the same reference signs and the description thereof will be omitted.

When it is determined at the server 30 that the battery 42 is in the predetermined state of deterioration, a battery protection mode execution command is transmitted from the server 30 to the vehicles 10 (S21). The battery protection mode execution command is a command to cause the vehicle 10 to execute the battery protection mode (S22). The battery protection mode referred to herein is a mode in which a decrease in the remaining amount of charge in the battery 42 is suppressed by restricting the start of remote air conditioning. At the user terminal 20, when the user operates the app so as to execute remote air conditioning, an air conditioning request is generated (S23). The air conditioning request is transmitted from the user terminal 20 to the server 30 (S24). Upon receiving the air conditioning request, the server 30 generates an air conditioning command and transmits it to the vehicle 10 (S25).

In the vehicle 10 that has received the air conditioning command, the battery protection mode is being executed, and hence, a remote air conditioning non-execution notification is transmitted to the server 30 (S26). The remote air conditioning non-execution notification is a notification that remote air conditioning cannot be executed. Upon receiving the remote air conditioning non-execution notification, the server 30 transmits the remote air conditioning non-execution notification to the user terminal 20 (S27). Then, the user terminal 20 displays, for example, the screen illustrated in FIG. 8 on the display 205 to indicate that the start of remote air conditioning is restricted (S28).

Figure 13:
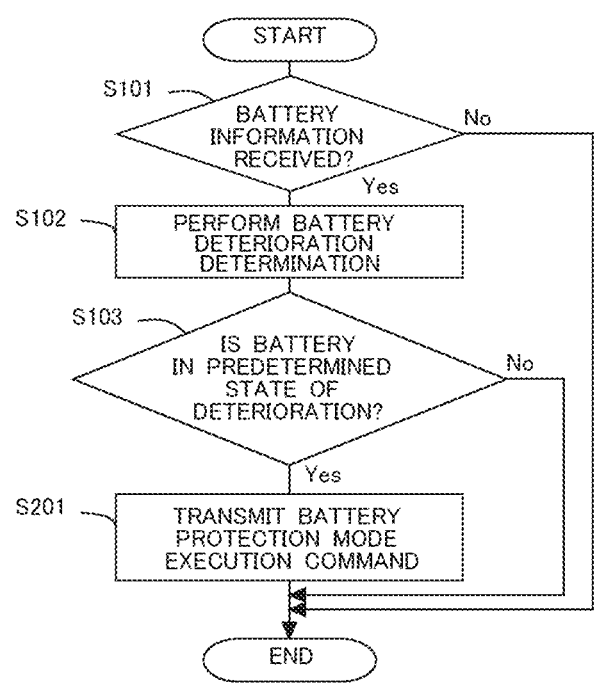
FIG. 13 is a flowchart of the processing of remote air conditioning in the server according to the second embodiment.

Next, the processing of remote air conditioning in each of the server 30 and the vehicle 10 will be described. FIG. 13 is a flowchart of the processing of the remote air conditioning in the server 30 according to the second embodiment. The processing illustrated in FIG. 13 is performed at predetermined time intervals at the server 30. In addition, the processing illustrated in FIG. 13 is performed for each vehicle 10. The flowchart illustrated in FIG. 13 represents the flow of processing performed at the server 30 in the case where the vehicle 10 restricts the start of remote air conditioning. Note that the steps in which the same processing is performed as in the routine illustrated in FIG. 11 are denoted by the same reference signs, and the description thereof will be omitted.

In the flowchart illustrated in FIG. 13, when an affirmative determination is made in step S103, the processing proceeds to step S201, whereas when a negative determination is made, this routine is ended. Then, in step S201, the control device 31 transmits a battery protection mode execution command to the vehicle 10.

Figure 14:
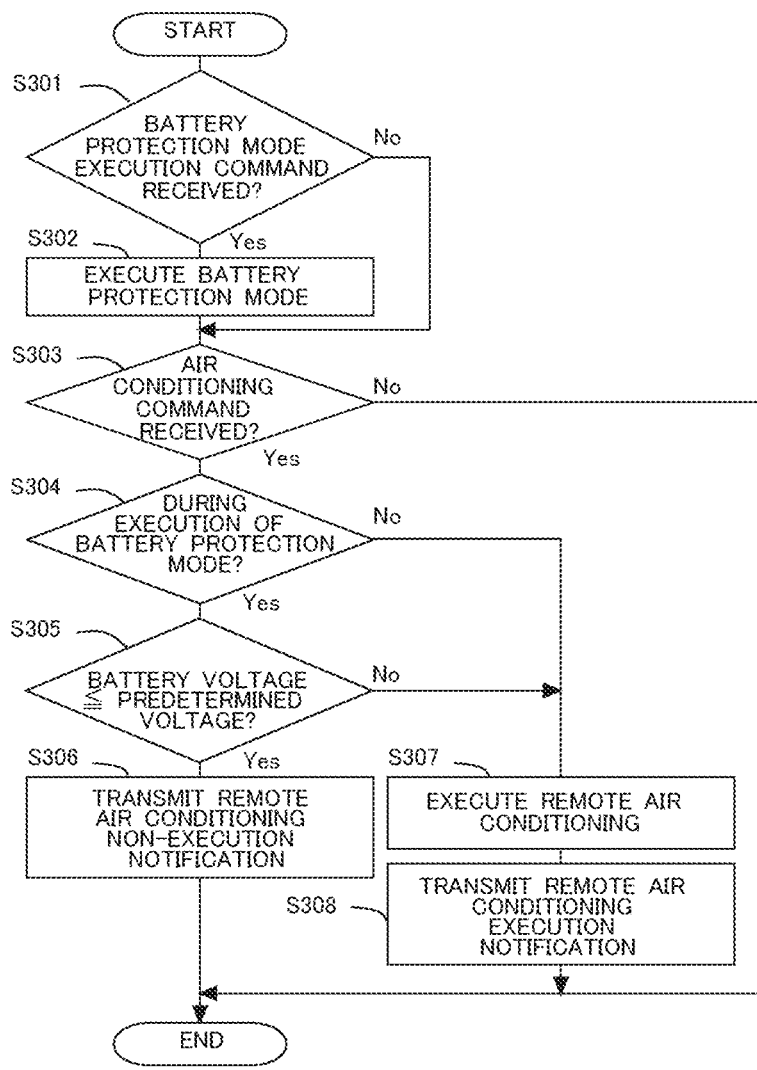
FIG. 14 is a flowchart of the processing of remote air conditioning in the vehicle according to the second embodiment.

Next, the processing of the remote air conditioning in the vehicle 10 will be described. FIG. 14 is a flowchart of the processing of the remote air conditioning in the vehicle 10 according to the second embodiment. The processing illustrated in FIG. 14 is performed at predetermined time intervals at the vehicle 10. The flowchart illustrated in FIG. 14 represents the flow of processing performed at the vehicle 10 in the case where the vehicle 10 restricts the start of remote air conditioning.

In step S301, the control device 110 determines whether or not a battery protection mode execution command has been received from the server 30. When an affirmative determination is made in step S301, the processing proceeds to step S302, whereas when a negative determination is made, the processing proceeds to step S303. In step S302, the control device 110 executes the battery protection mode. As a result, the start of remote air conditioning is restricted.

In step S303, the control device 110 determines whether or not an air conditioning command has been received from the server 30. When an affirmative determination is made in step S303, the processing or routine proceeds to step S304, whereas when a negative determination is made, this routine is ended.

In step S304, the control device 110 determines whether or not the battery protection mode is being executed. When an affirmative determination is made in step S304, the processing proceeds to step S305, whereas when a negative determination is made, the processing proceeds to step S307.

In step S305, the control device 110 determines whether or not the voltage of the battery 42 measured by the voltmeter 43 is equal to or less than a predetermined voltage. The predetermined voltage is a voltage at which it becomes difficult to move the vehicle 10 (i.e., a voltage at which it is difficult to start the engine 41) when remote air conditioning is executed in the case where the battery 42 is in the predetermined state of deterioration. When an affirmative determination is made in step S305, the processing proceeds to step S306, whereas when a negative determination is made, the processing proceeds to step S307. Thus, even if the battery protection mode is being executed, remote air conditioning may be executed as long as the voltage of the battery 42 is higher than the predetermined voltage. Here, note that, as an alternative, the processing of step S305 may be omitted. That is, when an affirmative determination is made in step S304, the processing may proceed to step S306.

Further, as another alternative, in step S305, the control device 110 may determine whether or not the number of executions of remote air conditioning is greater than a predetermined number of times. The predetermined number of times has been stored in the auxiliary storage unit 103 as the number of times remote air conditioning can be performed when the battery 42 is in the predetermined state of deterioration. Here, if the remote air conditioning is started and stopped a plurality of times, the remaining amount of charge in the battery 42 will be reduced each time, which may make it difficult to restart the engine 41. Therefore, by restricting the number of times remote air conditioning is executed after the predetermined state of deterioration is reached, it is possible to suppress difficulty in restarting the engine 41. The number of executions of remote air conditioning is counted by the control device 110 and stored in the auxiliary storage unit 103.

In step S306, the control device 110 transmits a remote air conditioning non-execution notification to the server 30. Upon receiving the remote air conditioning non-execution notification, the server 30 transmits the remote air conditioning non-execution notification to the user terminal 20.

On the other hand, in step S307, the control device 110 executes remote air conditioning. Then, in step S308, the control device 110 transmits an air conditioning execution notification to the server 30. The remote air conditioning execution notification is a notification that the remote air conditioning has been started.

As described above, according to the present embodiment, in the case where the battery 42 of the vehicle 10 is in the predetermined state of deterioration, the start of the remote air conditioning is restricted, so that a decrease in the remaining amount of charge in the battery 42 can be suppressed. As a result, it is possible to suppress the vehicle 10 from becoming unable to move.

Third Embodiment

Figure 15:
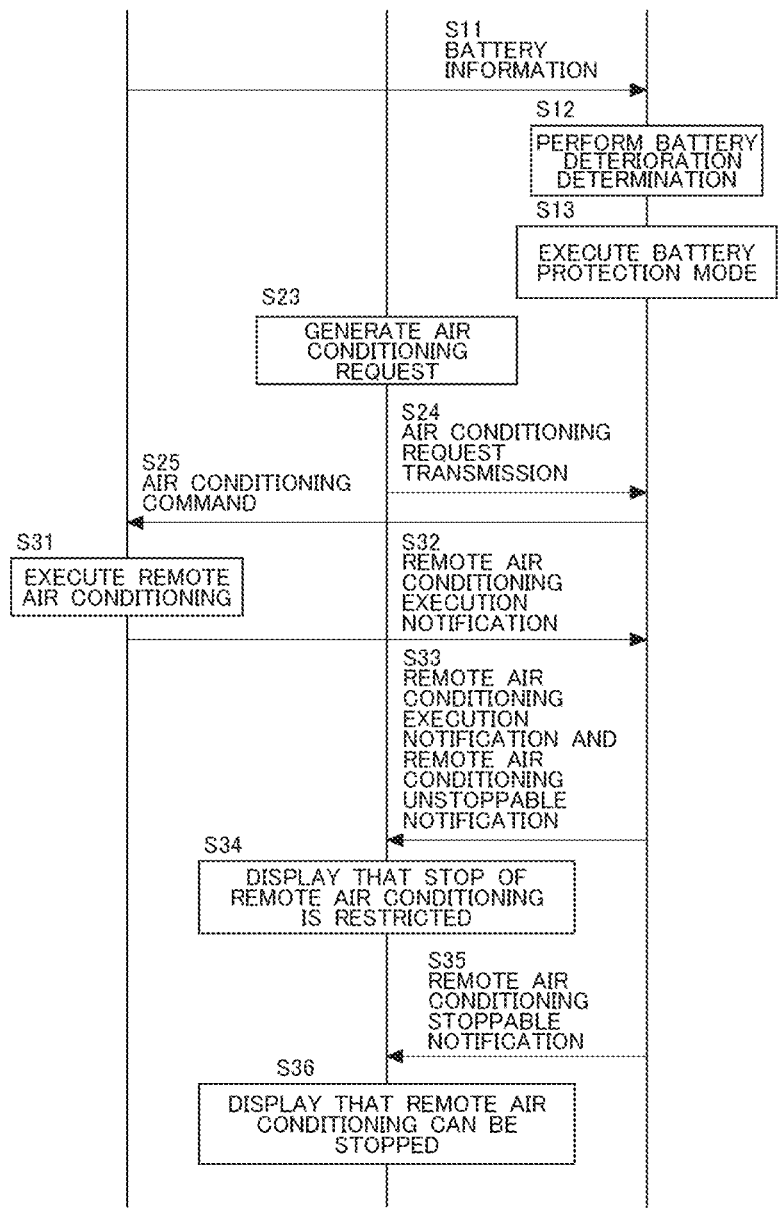
FIG. 15 is a sequence diagram of the processing of the system as a whole according to a third embodiment.

In a third embodiment, an example will be described in which the server 30 restricts the stop of the remote air conditioning. FIG. 15 is a sequence diagram of the processing of the system 1 as a whole according to the third embodiment. The vehicle 10 and the user terminal 20 illustrated in FIG. 15 have been associated with each other in advance and registered in the server 30. FIG. 15 is a sequence diagram in the case where the stop of remote air conditioning is restricted by the server 30. The same processing as in the sequence diagram illustrated in FIG. 10 or FIG. 12 will be denoted by the same reference signs and the description thereof will be omitted.

In the sequence diagram illustrated in FIG. 15, when an air conditioning command is transmitted from the server 30 (S25), the vehicle 10 executes remote air conditioning (S31). That is, in the vehicle 10, the engine 41 and the air conditioner 50 are operated. Then, a remote air conditioning execution notification is transmitted from the vehicle 10 to the server 30. The remote air conditioning execution notification is a notification that the remote air conditioning has been executed. In cases where the battery protection mode is being executed, the server 30 transmits to the user terminal 20 a remote air conditioning unstoppable notification together with a remote air conditioning execution notification (S33). The remote air conditioning unstoppable notification is a notification that the stop of the remote air conditioning is restricted. This notification may include a command to display the image illustrated in FIG. 9. Then, the user terminal 20 displays, for example, the image illustrated in FIG. 9 on the display 205 to indicate that the stop of the remote air conditioning is restricted (S34).

On the other hand, when a predetermined period of time, for example, has elapsed since the execution of the remote air conditioning, the server 30 transmits the remote air conditioning stoppable notification to the user terminal 20 (S35). The remote air conditioning stoppable notification is a notification that the restriction on the stop of the remote air conditioning has been lifted. The predetermined period of time is a time required for the remaining amount of charge in the battery 42 to recover to a remaining amount of charge required for the restart of the engine 41. Here, note that, as an alternative, battery information may be obtained from the vehicle 10, and a remote air conditioning stoppable notification may be transmitted, for example, in the case where the remaining amount of charge or voltage of the battery 42 has been sufficiently recovered. Upon receiving this notification, the user terminal 20 displays, for example, the screen illustrated in FIG. 7 on the display 205 to indicate that the remote air conditioning can be stopped (S36).

Figure 16:
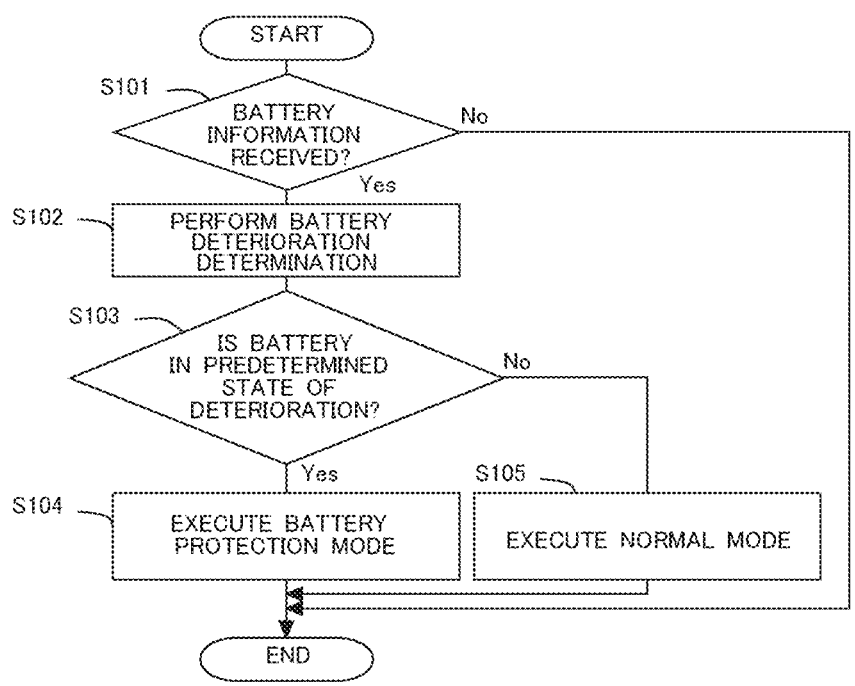
FIG. 16 is a flowchart of processing for executing a battery protection mode in the server according to the third embodiment.
Figure 17:
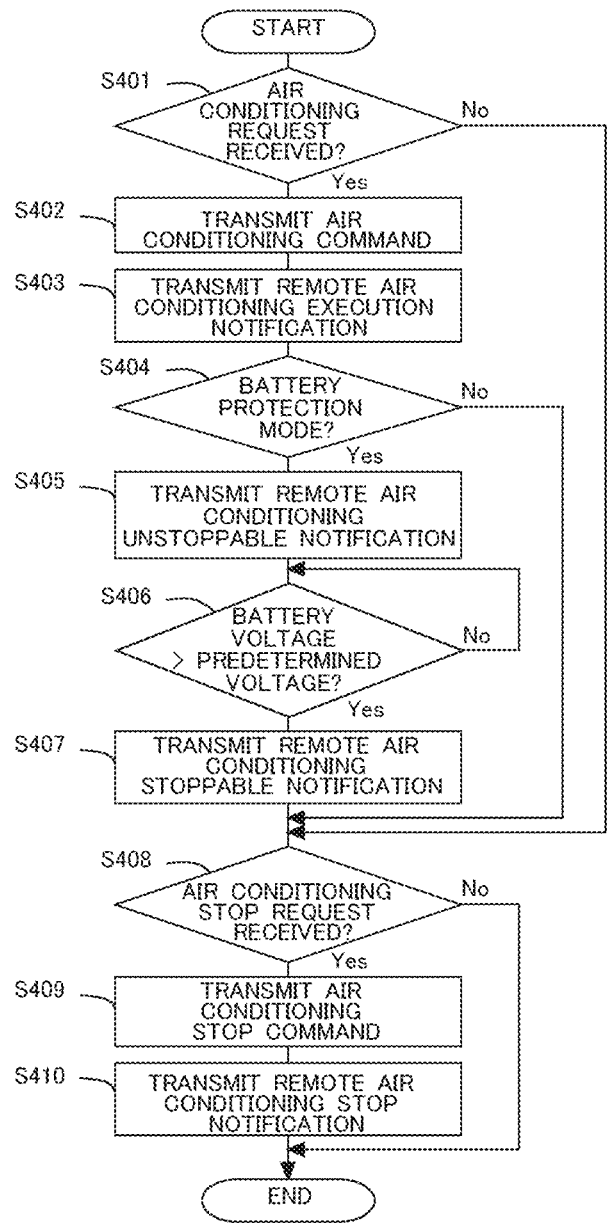
FIG. 17 is a flowchart of processing for restricting the stop of remote air conditioning in the server according to the third embodiment.

Next, processing in the case of restricting the stop of the remote air conditioning at the server 30 will be described. FIG. 16 is a flowchart of processing for executing the battery protection mode at the server 30 according to the third embodiment. The flowchart illustrated in FIG. 16 is the same as the first half of the flowchart illustrated in FIG. 11, and hence, the description thereof will be omitted. Then, FIG. 17 is a flowchart of processing for restricting the stop of remote air conditioning at the server 30 according to the third embodiment. The processing illustrated in FIG. 17 is performed at predetermined time intervals at the server 30. The flowchart illustrated in FIG. 17 is executed, for example, on the assumption that the processing illustrated in FIG. 16 has ended.

In step S401, the control device 31 determines whether or not an air conditioning request has been received from the user terminal 20. When an affirmative determination is made in step S401, the processing proceeds to step S402, whereas when a negative determination is made, the processing proceeds to step S408. In step S402, the control device 31 transmits an air conditioning command to the vehicle 10. In step S403, the control device 31 transmits a remote air conditioning execution notification to the user terminal 20.

In step S404, the control device 31 determines whether or not the battery protection mode is being executed. When an affirmative determination is made in step S404, the processing proceeds to step S405, whereas when a negative determination is made, the processing proceeds to step S408. In step S405, the control device 31 transmits a remote air conditioning unstoppable notification to the user terminal 20. The remote air conditioning unstoppable notification includes, for example, a command to display the image illustrated in FIG. 9 at the user terminal 20.

In step S406, the control device 31 determines whether or not the voltage of the battery 42 is higher than a predetermined voltage. The voltage of the battery 42 is included in the battery information, and is transmitted from the vehicle 10 to the server 30, for example, at predetermined time intervals. The predetermined voltage is the same as the predetermined voltage described in step S305. That is, in step S406, it is determined whether or not the vehicle 10 can be moved (whether or not the engine 41 can be started) even if the remote air conditioning is stopped. When an affirmative determination is made in step S406, the processing proceeds to step S407, whereas when a negative determination is made, the processing of step S406 is executed again. Here, note that, instead of determining the voltage in step S406, it may be determined whether or not a predetermined period of time has elapsed from the start of the remote air conditioning. The predetermined period of time is a time required to recover from the decrease in the remaining amount of charge due to the start of the remote air conditioning, and has been stored in the auxiliary storage unit 303.

In step S407, the control device 31 transmits a remote air conditioning stoppable notification to the user terminal 20. The remote air conditioning stoppable notification may include, for example, a command to change the image to be displayed on the user terminal 20 from the image illustrated in FIG. 9 to the image illustrated in FIG. 7.

In step S408, the control device 31 determines whether or not an air conditioning stop request has been received from the user terminal 20. When an affirmative determination is made in step S408, the processing or routine proceeds to step S409, whereas when a negative determination is made, this routine is ended. In step S409, the control device 31 transmits an air conditioning stop command to the vehicle 10. The air conditioning stop command is a command to stop the remote air conditioning. In the vehicle 10 that has received this command, the engine 41 and the air conditioner 50 are stopped. Then, in step S410, the control device 31 transmits a remote air conditioning stop notification to the user terminal 20. The remote air conditioning stop notification is a notification that the remote air conditioning has been stopped.

As described above, according to the present embodiment, in the case where the battery 42 of the vehicle 10 is in the predetermined state of deterioration, the stop of the remote air conditioning is restricted, so that the remaining amount of charge in the battery 42 can be recovered. As a result, it is possible to suppress the vehicle 10 from becoming unable to move.

Fourth Embodiment

Figure 18:
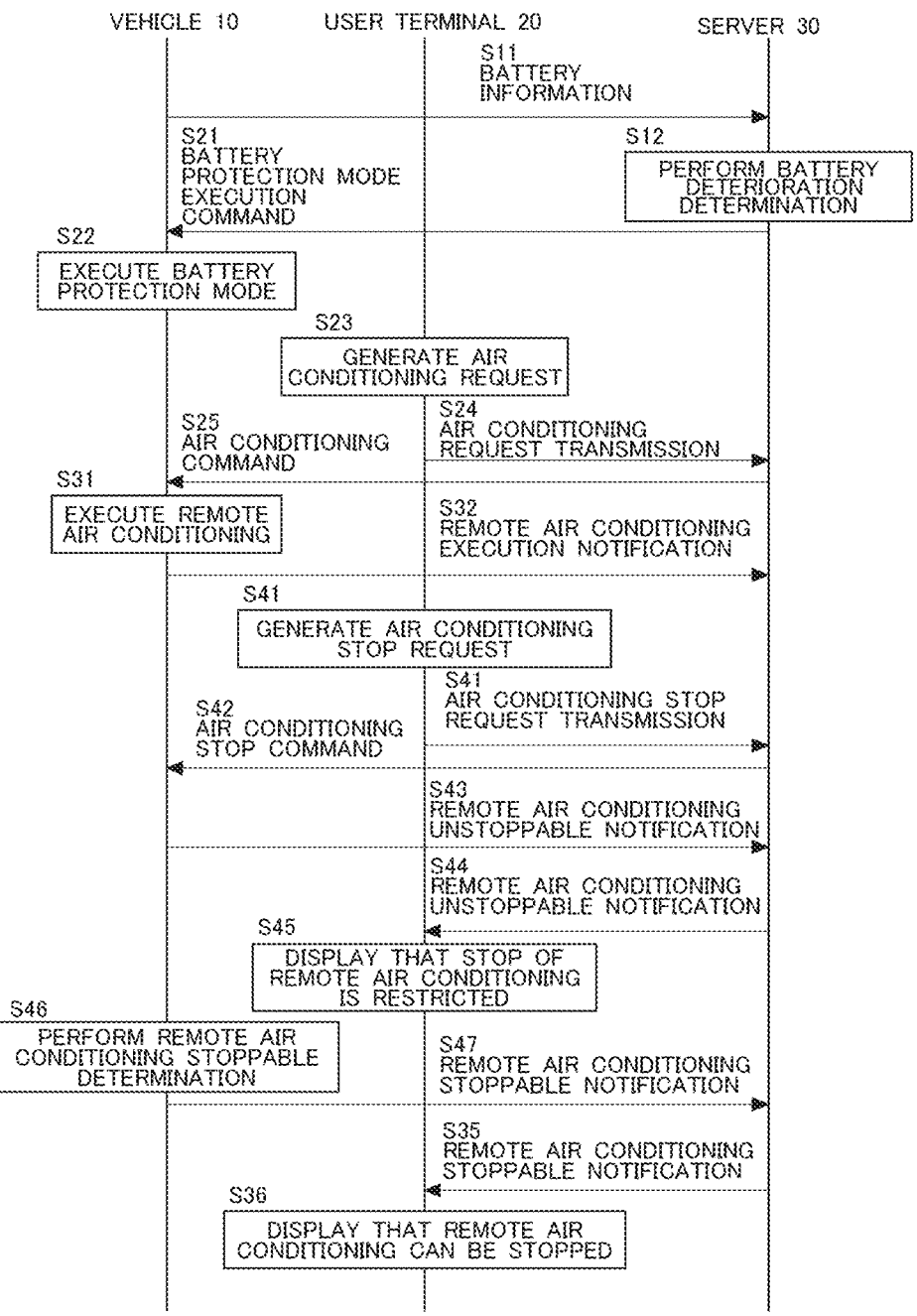
FIG. 18 is a sequence diagram of the processing of the system as a whole according to a fourth embodiment.

In a fourth embodiment, an example will be described in which the vehicle 10 restricts the stop of remote air conditioning. FIG. 18 is a sequence diagram of the processing of the system 1 as a whole according to the fourth embodiment. The vehicle 10 and the user terminal 20 illustrated in FIG. 18 have been associated with each other in advance and registered in the server 30. FIG. 18 is a sequence diagram in the case where the stop of remote air conditioning is restricted by the vehicle 10. The same processing as in the sequence diagram illustrated in FIG. 10, FIG. 12 or FIG. 15 will be denoted by the same reference signs and the description thereof will be omitted.

In the sequence diagram illustrated in FIG. 18, after remote air conditioning is executed, the user makes a predetermined input to the user terminal 20 to generate an air conditioning stop request (S41). The air conditioning stop request is transmitted from the user terminal 20 to the server 30. The server 30, which has received the air conditioning stop request, transmits an air conditioning stop command to the vehicle 10 (S42). At this time, in the vehicle 10, the battery protection mode is executed (S22), and remote air conditioning is executed (S31). Therefore, the vehicle 10 transmits a remote air conditioning unstoppable notification to the server 30 (S43). Further, the server 30 transmits a remote air conditioning unstoppable notification to the user terminal 20 (S44). Then, the user terminal 20 displays, for example, the screen illustrated in FIG. 9 on the display 205 to indicate that the stop of the remote air conditioning is restricted (S45).

In addition, the vehicle 10 determines whether or not the remote air conditioning can be stopped, for example, by determining whether or not the voltage of the battery is higher than the predetermined voltage (S46). When it is determined that the vehicle 10 can stop the remote air conditioning, a remote air conditioning stoppable notification is transmitted to the server 30 (S47). Then, the server 30 transmits the remote air conditioning stoppable notification to the user terminal 20 (S35). Then, at the user terminal 20, for example, the image illustrated in FIG. 7 is displayed to indicate that the remote air conditioning can be stopped (S36).

Figure 19:
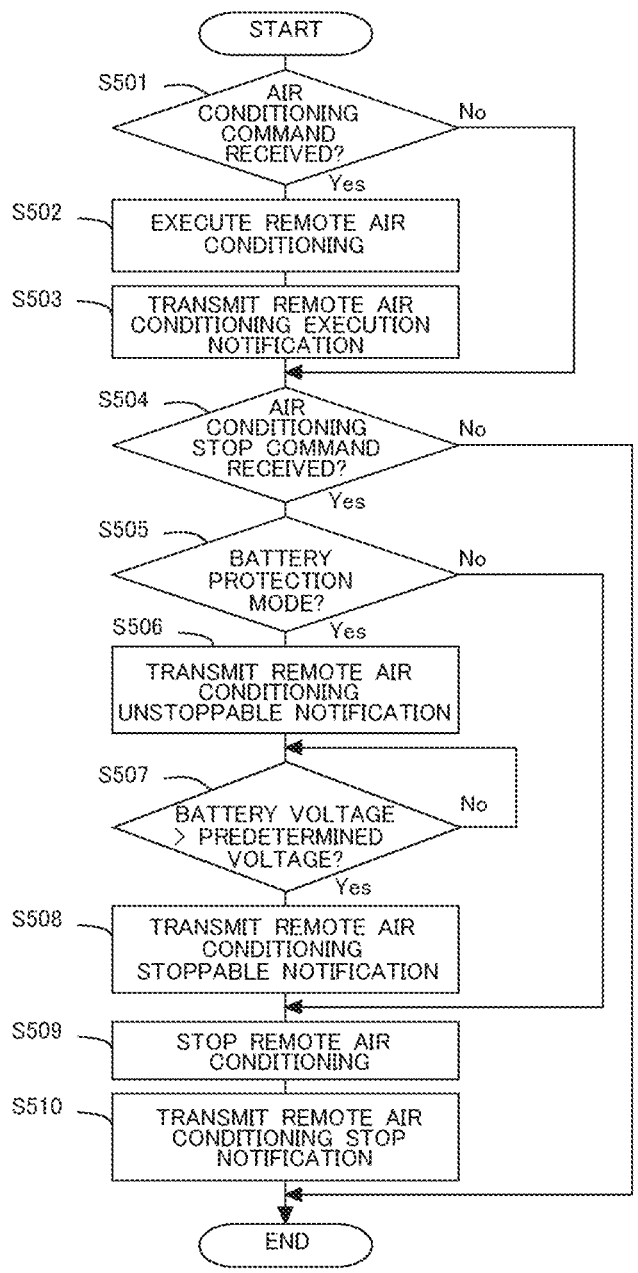
FIG. 19 is a flowchart of processing for restricting the stop of remote air conditioning in the vehicle according to the fourth embodiment.

Next, processing in the case of restricting the stop of the remote air conditioning in the vehicle 10 will be described. FIG. 19 is a flowchart of processing for restricting the stop of remote air conditioning in the vehicle 10 according to the fourth embodiment. The processing illustrated in FIG. 19 is performed at predetermined time intervals at the vehicle 10.

In step S501, the control device 110 determines whether or not an air conditioning command has been received from the server 30. When an affirmative determination is made in step S501, the processing proceeds to step S502, whereas when a negative determination is made, the processing proceeds to step S504. In step S502, the control device 110 executes remote air conditioning. In step S503, the control device 110 transmits a remote air conditioning execution notification to the server 30.

In step S504, the control device 110 determines whether or not an air conditioning stop command has been received from the server 30. When an affirmative determination is made in step S504, the processing or routine proceeds to step S505, whereas when a negative determination is made, this routine is ended. In step S505, the control device 110 determines whether or not the battery protection mode is being executed. When an affirmative determination is made in step S505, the processing proceeds to step S506, whereas when a negative determination is made, the processing proceeds to step S509.

In step S506, the control device 110 transmits a remote air conditioning unstoppable notification to the server 30. In step S507, the control device 110 determines whether or not the voltage of the battery 42 is higher than the predetermined voltage. When an affirmative determination is made in step S507, the processing proceeds to step S508, whereas when a negative determination is made, the processing of step S507 is executed again. Here, note that, instead of determining the voltage in step S507, it may be determined whether or not a predetermined period of time has elapsed from the start of the remote air conditioning. The predetermined period of time is a time required to recover from the decrease in the remaining amount of charge due to the start of the remote air conditioning, and has been stored in the auxiliary storage unit 103.

In step S508, the control device 110 transmits a remote air conditioning stoppable notification to the server 30. In step S509, the control device 110 stops the remote air conditioning. Then, in step S510, the control device 110 transmits an air conditioning stop notification to the server 30. Here, note that in the flowchart illustrated in FIG. 19, the remote air conditioning stop notification is transmitted in step S508, but this step may be omitted. That is, when an affirmative determination is made in step S507, the processing may proceed to step S509.

As described above, according to the present embodiment, in the case where the battery 42 of the vehicle 10 is in the predetermined state of deterioration, the stop of the remote air conditioning is restricted, so that the remaining amount of charge in the battery 42 can be recovered. As a result, it is possible to suppress the vehicle 10 from becoming unable to move.

Fifth Embodiment

In the above-mentioned embodiments, the server 30 determines whether or not the battery 42 is in the predetermined state of deterioration, but it can also be determined at the vehicle 10 or the user terminal 20. In a fifth embodiment, an example will be described in which it is determined at the vehicle 10 whether or not the battery 42 is in the predetermined state of deterioration, and in the case where the battery 42 is in the predetermined state of deterioration, the vehicle 10 restricts the start of the remote air conditioning.

Figure 20:
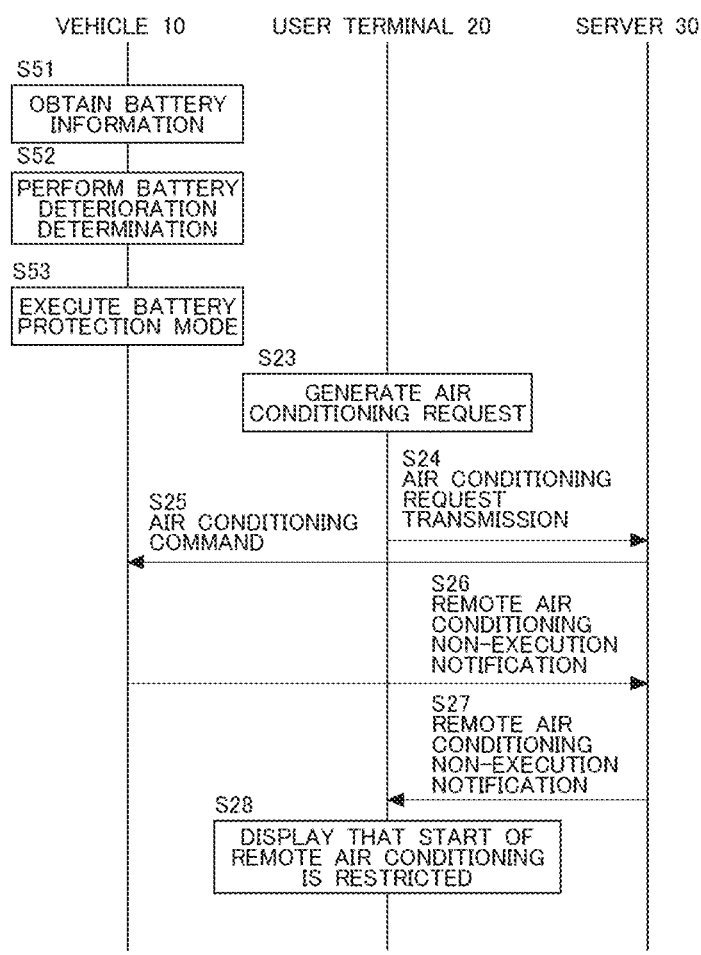
FIG. 20 is a sequence diagram of the processing of the system as a whole according to a fifth embodiment.

FIG. 20 is a sequence diagram of the processing of the system 1 as a whole according to the fifth embodiment. The vehicle 10 and the user terminal 20 illustrated in FIG. 20 have been associated with each other in advance and registered in the server 30. FIG. 20 is a sequence diagram in the case where the start of remote air conditioning is restricted by the vehicle 10. The same processing as in the sequence diagram illustrated in FIG. 12 will be denoted by the same reference signs and the description thereof will be omitted.

In the vehicle 10, when battery information is acquired (S51), deterioration determination of the battery 42 is performed based on the battery information (S52). Then, when it is determined at the vehicle 10 that the battery 42 is in the predetermined state of deterioration, a battery protection mode is executed (S53). The battery protection mode referred to herein is a mode in which a decrease in the remaining amount of charge in the battery 42 is suppressed by restricting the start of remote air conditioning. The subsequent processing is the same as that in step S23 and subsequent steps in FIG. 12, and hence, the description thereof will be omitted. Here, note that in the case where the stop of the remote air conditioning is restricted, the battery protection mode is executed in the same manner.

Figure 21:
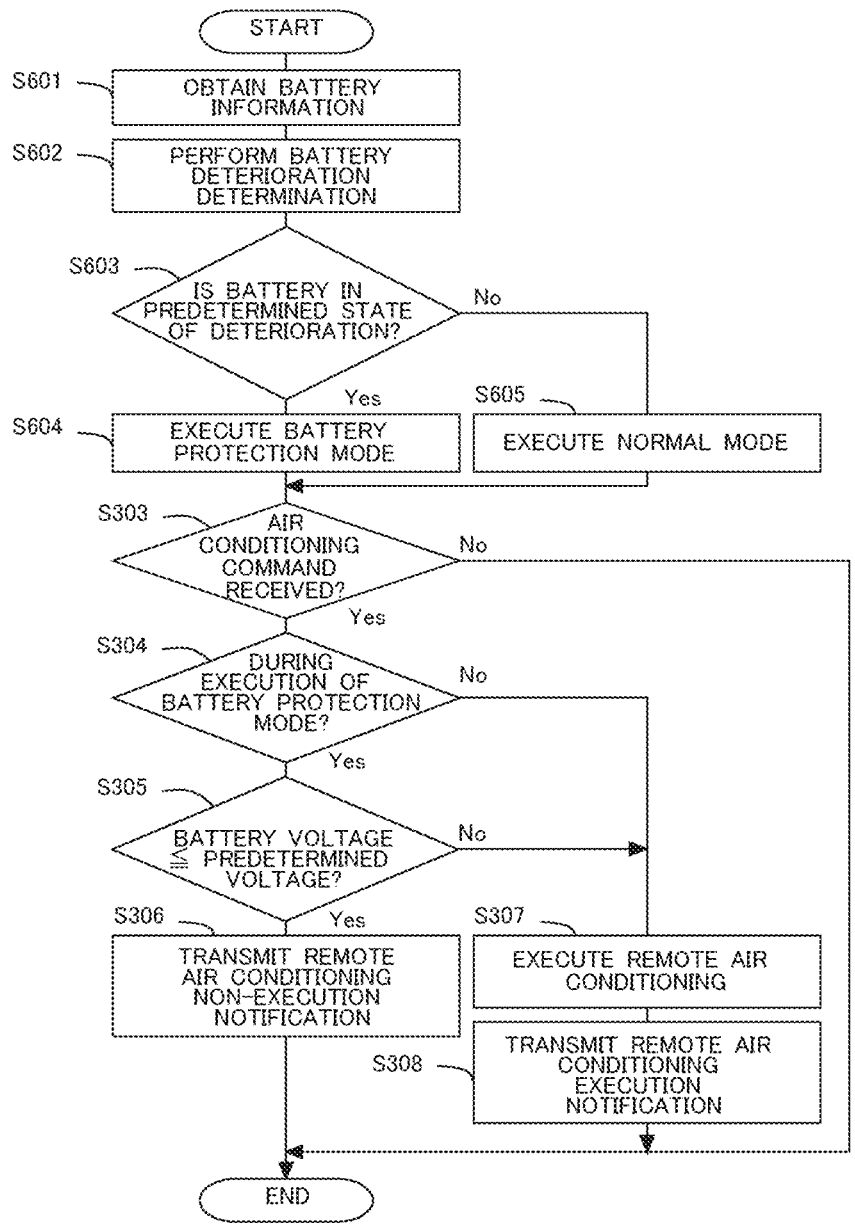
FIG. 21 is a flowchart of the processing of remote air conditioning in the vehicle according to the fifth embodiment.

Next, the processing of the remote air conditioning in the vehicle 10 will be described. FIG. 21 is a flowchart of the processing of the remote air conditioning in the vehicle 10 according to the fifth embodiment. The processing illustrated in FIG. 21 is performed at predetermined time intervals at the vehicle 10. The flowchart illustrated in FIG. 21 represents the flow of processing performed at the vehicle 10 in the case where the vehicle 10 restricts the start of remote air conditioning. Note that the steps in which the same processing is performed as in the routine illustrated in FIG. 14 are denoted by the same reference signs, and the description thereof will be omitted.

In step S601, the control device 110 obtains battery information. The control device 110 obtains, for example, information about the voltage measured by the voltmeter 43. In step S602, the control device 110 determines the state of deterioration of the battery 42. The state of deterioration of the battery 42 may be determined based on a known technique. In step S603, the control device 110 determines whether or not the battery 42 is in the predetermined state of deterioration. When an affirmative determination is made in step S603, the processing proceeds to step S604, whereas when a negative determination is made, the processing proceeds to step S605. In step S604, the control device 110 executes the battery protection mode. On the other hand, in step S605, the control device 110 executes a normal mode. The normal mode is a mode in which remote air conditioning is executed when an air conditioning command is received from the server 30.

In this way, it is possible to determine the state of deterioration of the battery 42 at the vehicle 10 and restrict the start or stop of the remote air conditioning. As a result, it is possible to suppress a decrease in the remaining amount of charge in the battery 42, thus making it possible to suppress the vehicle 10 from becoming unable to move.

Other Embodiments

The above-described embodiments are merely examples, but the present disclosure can be implemented with appropriate modifications without departing from the spirit thereof. The processing and/or means (devices, units, etc.) described in the present disclosure can be freely combined and implemented as long as no technical contradiction occurs. In addition, the processing described as being performed by a single device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner. For example, the vehicle 10 may have a part or all of the functions of the server 30.

In addition, in the third and fourth embodiments, the stop of the remote air conditioning is restricted, but there may be a case where the user wants to stop the remote air conditioning immediately depending on the situation. Therefore, if the user wants to stop the remote air conditioning, the remote air conditioning may be allowed to be stopped.

Figure 22:
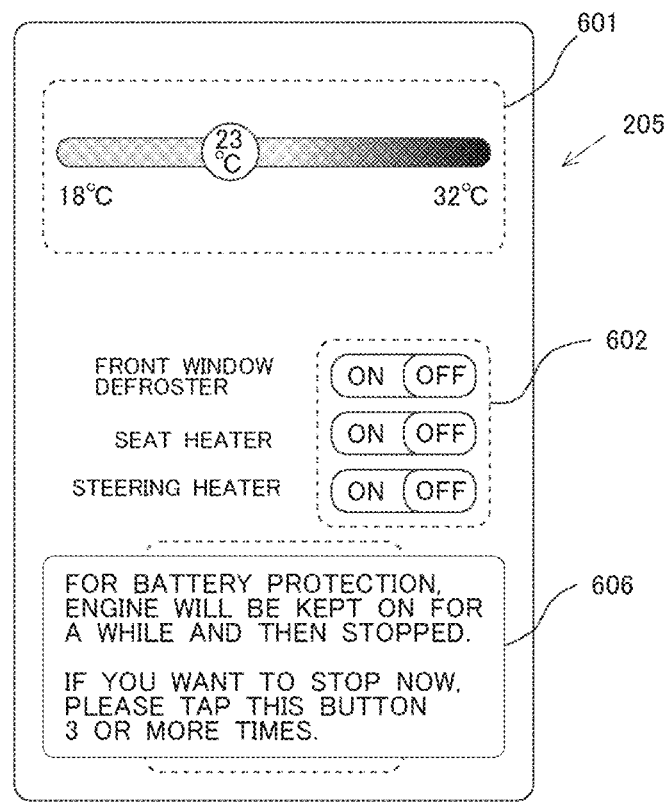
FIG. 22 is a view illustrating an example of an image displayed on the display in the case where remote air conditioning can be stopped even when the stop of the remote air conditioning is restricted.

FIG. 22 is a view illustrating an example of an image displayed on the display 205 in the case where remote air conditioning can be stopped even when the stop of the remote air conditioning is restricted. In this view, it is displayed, as indicated by reference numeral 606, that when the stop of the remote air conditioning is restricted, a button is tapped three or more times, for example, so that the remote air conditioning can be stopped. Then, when the user taps the button denoted by reference numeral 606 three or more times, for example, information to that effect is transmitted from the user terminal 20 to the server 30. Upon receiving this information, the server 30 transmits to the vehicle 10 a command to stop the remote air conditioning even during the execution of the battery protection mode. On the other hand, when the battery protection mode is being executed in the vehicle 10, the server 30 transmits to the vehicle 10 a command to stop the remote air conditioning even during the execution of the battery protection mode. Upon receipt of this command, the vehicle 10 stops the remote air conditioning even while the battery protection mode is being executed.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus comprising a controller configured to:
   determine whether a battery of a vehicle is in a predetermined state of deterioration; and
   upon determination that the battery of the vehicle is in the predetermined state of deterioration:
   provide a restriction on a start or stop of remote air conditioning by transmitting a command to a terminal of a user so that a request for the start or stop of the remote air conditioning is not generated at the terminal of the user, or by transmitting a command to the vehicle so that the request for the start or stop of the remote air conditioning is not accepted at the vehicle.

2. The information processing apparatus according to claim 1, wherein
   the controller is configured to provide the restriction on the stop of the remote air conditioning, by not accepting a request to stop the remote air conditioning from a terminal of a user until a voltage of the battery becomes higher than a predetermined voltage due to power generation by an engine, after activating the remote air conditioning in response to a request to start the remote air conditioning received from the terminal of the user.

3. The information processing apparatus according to claim 1, wherein
   the controller is configured to provide the restriction on the stop of the remote air conditioning, by not accepting a request to stop the remote air conditioning from a terminal of a user until a predetermined period of time elapses, after activating the remote air conditioning in response to a request to start the remote air conditioning received from the terminal of the user.

4. The information processing apparatus according to claim 1, wherein
   the controller is configured to provide the restriction on the start of the remote air conditioning by restricting a number of executions of the remote air conditioning.

5. The information processing apparatus according to claim 1, wherein
   the controller is configured to perform:
   obtaining information about a state of deterioration of the battery of the vehicle;
   determining, based on information about the state of deterioration of the battery, whether or not the battery is in the predetermined state of deterioration;
   executing a battery protection mode, which is a mode that restricts the start or stop of the remote air conditioning, upon determination that the battery is in the predetermined state of deterioration;
   receiving a request for the start or stop the remote air conditioning from a terminal of a user; and
   notifying the terminal of the user that the start or stop of the remote air conditioning is restricted, in response to receiving the request during the execution of the battery protection mode.

6. An information processing method comprising causing a computer to:
   determine whether a battery of a vehicle is in a predetermined state of deterioration; and
   upon determination that the battery of the vehicle is in the predetermined state of deterioration:
   provide a restriction on a start or stop of remote air conditioning by transmitting a command to a terminal of a user so that a request for the start or stop of the remote air conditioning is not generated at the terminal of the user, or by transmitting a command to the vehicle so that the request for the start or stop of the remote air conditioning is not accepted at the vehicle.

7. The information processing method according to claim 6, further comprising:
   causing the computer to provide the restriction on the stop of the remote air conditioning, by not accepting a request to stop the remote air conditioning from a terminal of a user until a voltage of the battery becomes higher than a predetermined voltage due to power generation by an engine, after activating the remote air conditioning in response to a request to start the remote air conditioning received from the terminal of the user.

8. The information processing method according to claim 6, further comprising:
   causing the computer to provide the restriction on the stop of the remote air conditioning, by not accepting a request to stop the remote air conditioning from a terminal of a user until a predetermined period of time elapses, after activating the remote air conditioning in response to a request to start the remote air conditioning received from the terminal of the user.

9. The information processing method according to claim 6, further comprising:
   causing the computer to provide the restriction on the start of the remote air conditioning by restricting a number of executions of the remote air conditioning.

10. The information processing method according to claim 6, further comprising:
    causing the computer to perform:
    obtaining information about a state of deterioration of the battery of the vehicle; and
    determining, based on information about the state of deterioration of the battery, whether or not the battery is in the predetermined state of deterioration;
    executing a battery protection mode, which is a mode that restricts the start or stop of the remote air conditioning, upon determination that the battery is in the predetermined state of deterioration;
    receiving a request for the start or stop the remote air conditioning from a terminal of a user; and
    notifying the terminal of the user that the start or stop of the remote air conditioning is restricted, in response to receiving the request during the execution of the battery protection mode.

11. A system comprising:
    a vehicle configured to execute remote air conditioning by operating an engine; and
    a server configured to transmit a command for execution of the remote air conditioning to the vehicle;
    wherein the server comprises a controller configured to perform:
    obtaining information about a state of deterioration of a battery of the vehicle;
    determining whether a battery of a vehicle is in a predetermined state of deterioration; and
    upon determination that the battery of the vehicle is in the predetermined state of deterioration:
    providing a restriction on a start or stop of the remote air conditioning by transmitting a command to a terminal of a user so that a request for the start or stop of the remote air conditioning is not generated at the terminal of the user, or by transmitting a command to the vehicle so that the request for the start of stop of the remote air conditioning is not accepted at the vehicle.

12. The system according to claim 11, wherein
the controller is configured to provide the restriction on the stop of the remote air conditioning, by not accepting a request to stop the remote air conditioning from a terminal of a user until a voltage of the battery becomes higher than a predetermined voltage, after activating the remote air conditioning in response to a request to start the remote air conditioning received from the terminal of the user.

13. The system according to claim 11, wherein
the controller is configured to provide the restriction on the stop of the remote air conditioning, by not accepting a request to stop the remote air conditioning from a terminal of a user until a predetermined period of time elapses, after activating the remote air conditioning in response to a request to start the remote air conditioning received from the terminal of the user.

14. The system according to claim 11, wherein
the controller is configured to provide the restriction on the start of the remote air conditioning by restricting a number of executions of the remote air conditioning.

* * * * *